US012006897B2

(12) United States Patent
Lepsch et al.

(10) Patent No.: US 12,006,897 B2
(45) Date of Patent: Jun. 11, 2024

(54) DEVICE FOR HEATING FUEL

(71) Applicant: Robert Bosch Limitada, Campinas SP (BR)

(72) Inventors: Fernando Lepsch, Campinas SP (BR); Marcello Francisco Brunocilla, Indaiatuba SP (BR)

(73) Assignee: Robert Bosch Limitada, Campinas (BR)

( * ) Notice: Subject to any disclaimer, the term of this patent is extended or adjusted under 35 U.S.C. 154(b) by 0 days.

(21) Appl. No.: 18/256,852

(22) PCT Filed: Dec. 8, 2021

(86) PCT No.: PCT/BR2021/050545
§ 371 (c)(1),
(2) Date: Jun. 9, 2023

(87) PCT Pub. No.: WO2022/133563
PCT Pub. Date: Jun. 30, 2022

(65) Prior Publication Data

US 2024/0018923 A1 Jan. 18, 2024

(30) Foreign Application Priority Data

Dec. 22, 2020 (BR) ...................... 10 2020 026406 0

(51) Int. Cl.
*F02M 31/125* (2006.01)

(52) U.S. Cl.
CPC ................................. *F02M 31/125* (2013.01)

(58) Field of Classification Search
CPC ....................... F02M 31/125; F02M 2700/435
USPC .................................. 123/142.5 R, 549, 557
See application file for complete search history.

(56) References Cited

U.S. PATENT DOCUMENTS

| | | | | |
|---|---|---|---|---|
| 4,275,699 | A * | 6/1981 | Troglin | F02M 31/18 123/549 |
| 4,790,285 | A | 12/1988 | Wolf | |
| 4,793,317 | A * | 12/1988 | Grenet | F02M 31/125 123/549 |
| H1820 | H | 12/1999 | Graves et al. | |
| 9,863,360 | B2 | 1/2018 | McQuillen et al. | |
| 10,393,053 | B2 | 8/2019 | Uchiyama et al. | |
| 2009/0037076 | A1* | 2/2009 | Oshihara | F02D 41/0027 701/103 |

(Continued)

FOREIGN PATENT DOCUMENTS

| | | | |
|---|---|---|---|
| BR | PI0902488 | A2 | 4/2010 |
| BR | 102019027843 | A2 | 7/2021 |
| BR | 102019027845 | A2 | 7/2021 |

(Continued)

OTHER PUBLICATIONS

Translation of International Search Report for Application No. PCT/BR2021/050545 dated Apr. 7, 2022 (3 pages).

*Primary Examiner* — Erick R Solis
(74) *Attorney, Agent, or Firm* — Michael Best & Friedrich LLP

(57) ABSTRACT

The present invention relates to a device for heating injected fuel in internal combustion engines integrated with a temperature sensor capable of measuring the temperature of the fuel immediately after heating, forming a unique set that provides great accuracy in the amount of power supplied to the heater and accuracy in fuel preheating temperature.

5 Claims, 2 Drawing Sheets

(56) References Cited

U.S. PATENT DOCUMENTS

| | | | | |
|---|---|---|---|---|
| 2009/0308361 | A1* | 12/2009 | Oshihara | F23K 5/08<br>123/557 |
| 2010/0012102 | A1* | 1/2010 | Webb | F02M 31/125<br>123/557 |

FOREIGN PATENT DOCUMENTS

| | | | | |
|---|---|---|---|---|
| CN | 205297781 | U | 6/2016 | |
| DE | 102015114716 | A1 | 3/2017 | |
| EP | 0247697 | B1 | 12/1991 | |
| JP | H0526130 | A | 2/1993 | |
| JP | 2011080378 | A | 4/2011 | |
| KR | 20110005292 | U | 5/2011 | |
| KR | 101163805 | B1 | 7/2012 | |
| WO | WO-2007043031 | A1 * | 4/2007 | F01N 5/02 |
| WO | WO2015069265 | A1 | 5/2015 | |
| WO | WO2017084901 | A1 | 5/2017 | |
| WO | WO2017221036 | A1 | 12/2017 | |
| WO | WO2017221039 | A1 | 12/2017 | |

* cited by examiner

DEVICE FOR HEATING FUEL

BACKGROUND

The present invention relates to a fuel heating device applicable in fuel injected temperature management systems in combustion engines that allows the reduction of the amount of fuel injected in engines that can be powered both with pure gasoline and with ethanol or any bi-fuel mixture through precise control of the amount of heat supplied to the fuel.

In recent years, problems with the amount of pollutants emitted (HC, CO, $CO_2$ and particulates, among others) mainly by car engines, has been a major problem for large cities. Thus, new technologies have been developed to help reduce pollutants emitted by internal combustion engines.

In order to mitigate the emission of greenhouse gases from automobiles and reduce dependence on fossil fuels, several alternatives for replacing the internal combustion engine are available. However, the best solution to this dilemma must take into account the geographic and socio-economic characteristics of the country, its energy matrix, its emissions legislation and the environmental impact of the fuel's carbon emissions throughout its life cycle.

Brazil has a strong reputation for its fleet of flex-fuel vehicles, long experience in the use of fuel ethanol and its distribution network. This sets it apart from other global markets and justifies a unique approach to reducing aldehyde emissions, for example.

Yet, there are some limitations in the use of dual-fuel engines (popularly known as flex-fuel engines). To meet the demand for using two fuels in a single tank, the sizing of a flex-fuel engine tends to be intermediate, since the sizing of single-fuel engines is different, depending on the fuel ethanol or gasoline. This is because the vast majority of dual-fuel engines usually have a single geometric compression ratio, which represents the ratio between the aspirated volume plus the combustion chamber volume in relation to the combustion chamber volume).

In its course, the piston reaches a higher and a lower point in its displacement, called respectively top dead center (TDC) and bottom dead center (BDC).

Usually, the engine of a passenger vehicle has four strokes:

Admission
Compression
Combustion
Escape

The effect of the compression rate is evident in the second half—the intake valves close after the injection of the air/fuel mixture and the latter is compressed so that the combustion process begins. In this way, the engine's geometric compression ratio is obtained: the ratio between the volume of the piston's combustion chamber at its bottom dead center PMI (largest volume) and its top dead center PMS (smallest volume).

Gasoline engines tend to use lower compression ratios (typically between 8:1 and 12:1), while ethanol-powered engines work best with higher ratios (12:1 or even 14:1).

However, before the fuel reaches the combustion chamber, it travels a path from the vehicle's tank. This fuel is moved by a fuel pump and flows through ducts that transport the fuel—first, a hose and, later, a more rigid and branched duct called a gallery. The branches lead the fuel to be injected into the respective cylinders and it is at the exit of these branches where the fuel injectors are positioned.

In addition, the impingement of fuel on the surface of the piston or on the walls of the intake ducts can contribute to the increase of emitted particles. Moreover, fuel condensation in cold zones of the engine can result in incomplete combustion generating hydrocarbons and carbon monoxide (HC and CO).

When talking about engines that use the Otto cycle (engines traditionally used in cars), both those that use Port Fuel Injection (PFI) and those that work with Direct Injection (DI) emit particulates above of the allowed limits. Therefore, the use of a particle filter for gasoline engines (whose acronym is GPF, as it comes from the English Gasoline Particulate Filter) has been recommended to comply with the new legislation on particle emissions that came into force.

However, even with the use of GPF, engines can still generate particulates above the limits determined by official health agencies, since pollutant emissions also depend on the behavior of drivers regarding the way they drive and proper vehicle maintenance.

For this reason, one of the most effective techniques to obtain a more correct burning of the fuel is to deliver it to the previously heated combustion chamber.

As is known, when the fuel temperature management system knows the temperature of the fuel being delivered in real time by directly reading the fuel temperature at the position where it is delivered to the injector, the amount of energy required for the heater to raise the fuel temperature to the desired level is faster and more accurate, as there is no need to use mathematical models to arrive at the current temperature value.

Therefore, the main technical problem to be overcome is the fact of being able to read the fuel temperature at the most extreme point of the heater, as close as possible to the point where the heated fuel is delivered to the injector of fuel, always aiming for greater precision.

That said, as one of the most effective techniques to obtain a more correct burning of the fuel is to deliver it to the previously heated combustion chamber, it is understood that there is a need to integrate a temperature sensor into the fuel heater.

In this regard, some solutions are already known, such as the one described in patent document PI 0902488-3. This document describes a fuel heater provided for internal combustion engines having a device to determine the fuel temperature and pressure, adjust the target fuel temperature, according to the fuel pressure detected by a pressure sensor and a fuel temperature control device that controls the fuel heater so as to adjust the temperature detected by a sensor to the target temperature of the fuel.

However, in the invention described in this patent document, the use of a fuel pressure sensor is mandatory, causing the target temperature to be adjusted according to the measured fuel pressure. In addition, the technique described in this document does not mention the need to know the temperature upstream of the heater, which makes the calculation of the power required to heat the fuel even less accurate, not satisfactorily meeting the requirement of obtaining a reduction in emissions of polluting gases.

Another technique related to the present problem is described in patent document WO2017/221036. In general terms, this invention describes a vehicle that has reduced fuel injection volumes due to fuel heating. In more detail, that document describes a vehicle with an internal combustion engine provided with at least one heater to heat the fuel before it is delivered to the cylinder by the fuel injector; a fuel pump to supply fuel to the heater, and an electronic controller to control engine torque and fuel pressure generated by the pump, the engine controller using a model based on heating the heated engine fuel to control an amount of heated fuel supplied by the fuel injector, in order to reduce the amount of fuel injected for a given engine torque in relation to unheated fuel; and cause greater fuel pressure to be generated by the fuel pump relative to unheated fuel.

The technique described in the patent document WO2017/221039 describes a system in which the control of the amount of fuel injected into the engine and the increase in fuel pressure is performed based on a model of fuel heating in relation to the unheated model. That is, it uses a very complicated logic, which uses two injection control methods.

In this scenario, it is understood to be fundamental to control the temperature, according to the dynamic operating load of the engine, so as not to provide heating that requires excessive and unnecessary energy to heat the fuel to reduce emissions of polluting gas, and none of the patent documents mentioned above describes a technique that integrates a temperature sensor to a fuel heater, in order to provide a single set, which would facilitate the management of fuel temperature, according to the operating dynamics of the vehicle engine.

SUMMARY

Therefore, the present invention proposes to solve the problems of the state of the art in a much more efficient way, aiming at an extremely accurate temperature reading.

The present invention aims to provide a device for heating injected fuel in internal combustion engines integrated with a temperature sensor capable of measuring the temperature of the fuel immediately after heating, forming a unique set that provides great accuracy in the amount of power supplied to the heater, accuracy in the fuel preheating temperature and, consequently, a great precision in the reduction of polluting gases.

In order to solve the technical problem presented and overcome the drawbacks of the state of the art, the present invention aims to provide a device for heating fuel equipped with

- at least one interface region;
- at least one fuel inlet opening;
- at least one fuel outlet opening;
- at least a portion of fuel output;
- at least one heating chamber provided with an internal region, cooperating with the interface region, so as to project from the inlet portion;
- at least one heating element projecting from the interface region, fluidly associated with the heating chamber;
- said device comprising a temperature sensor provided with a thermo element and associated with the interface region and projecting from the interface region, so that the thermo element is positioned downstream of the heating element through the interior of the heating chamber.

DETAILED DESCRIPTION

The fuel heating and heating management system is responsible for heating the fuel that will be injected into the engine to a predetermined temperature. Fuel heating aims to improve the atomization of the injected fuel spray, reducing its droplet size, which means better preparation of the air-fuel mixture, leading to a more homogeneous mixture, which will result in a decrease in the amount of fuel injected and thus reducing the amount of gases and particulates emitted.

The operation of the heating system takes place from the start of the engine. System management aims to keep the temperature of the injected fuel always at the target temperature. For this, the system determines the amount of energy that must be supplied to the fuel, based on the fuel inlet temperature in the gallery, the fuel flow rate and the type of fuel.

When the fuel temperature management system knows exactly what temperature of the fuel is being delivered in real time, through the direct reading of the fuel temperature at the position where it is delivered to the injector, the amount of energy needed for the heater to raise the fuel temperature to the desired level is made available more quickly and accurately, as there is no need to use mathematical models to arrive at the current temperature value.

Figure 1:
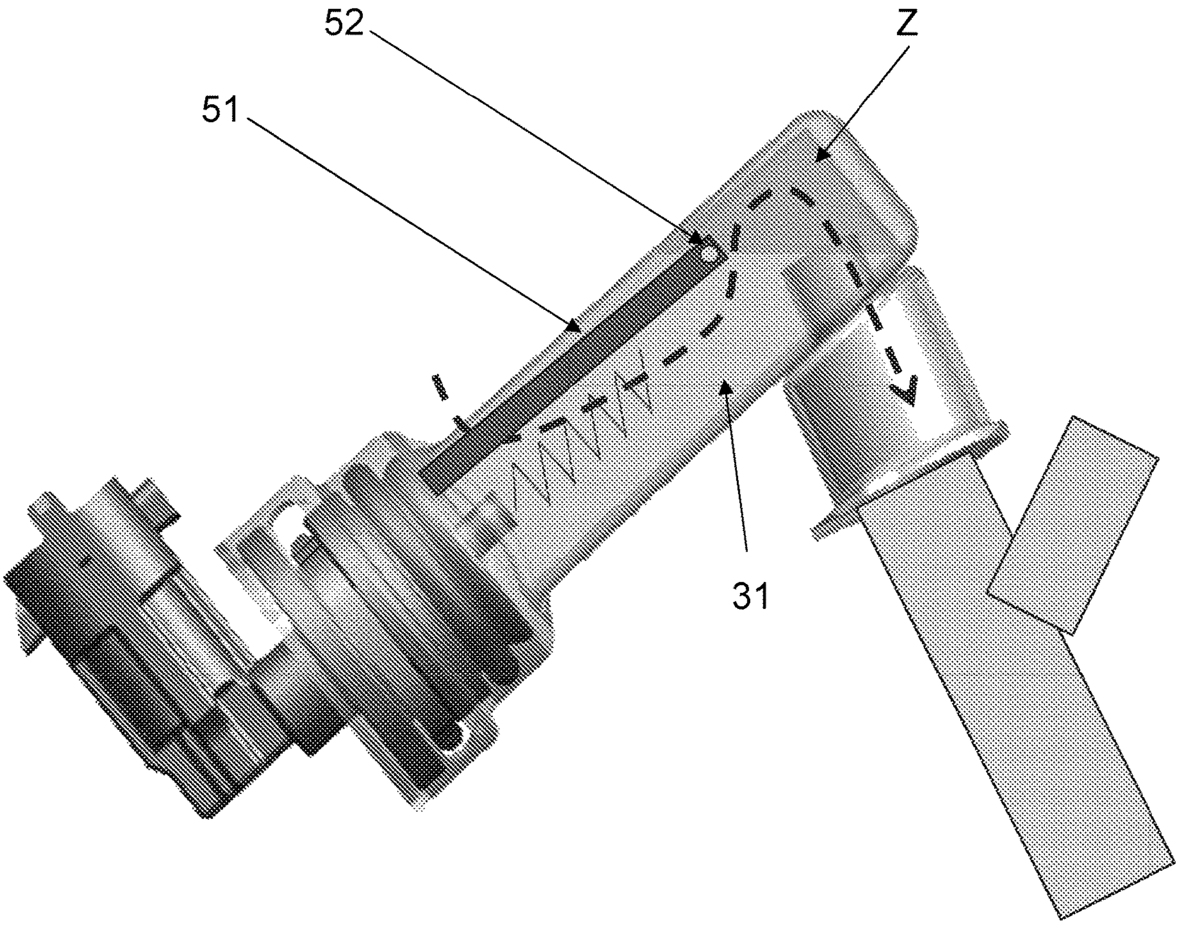
FIG. 1—Scheme of an embodiment of the fuel heating device where the interface region is positioned downwards.
Figure 2:
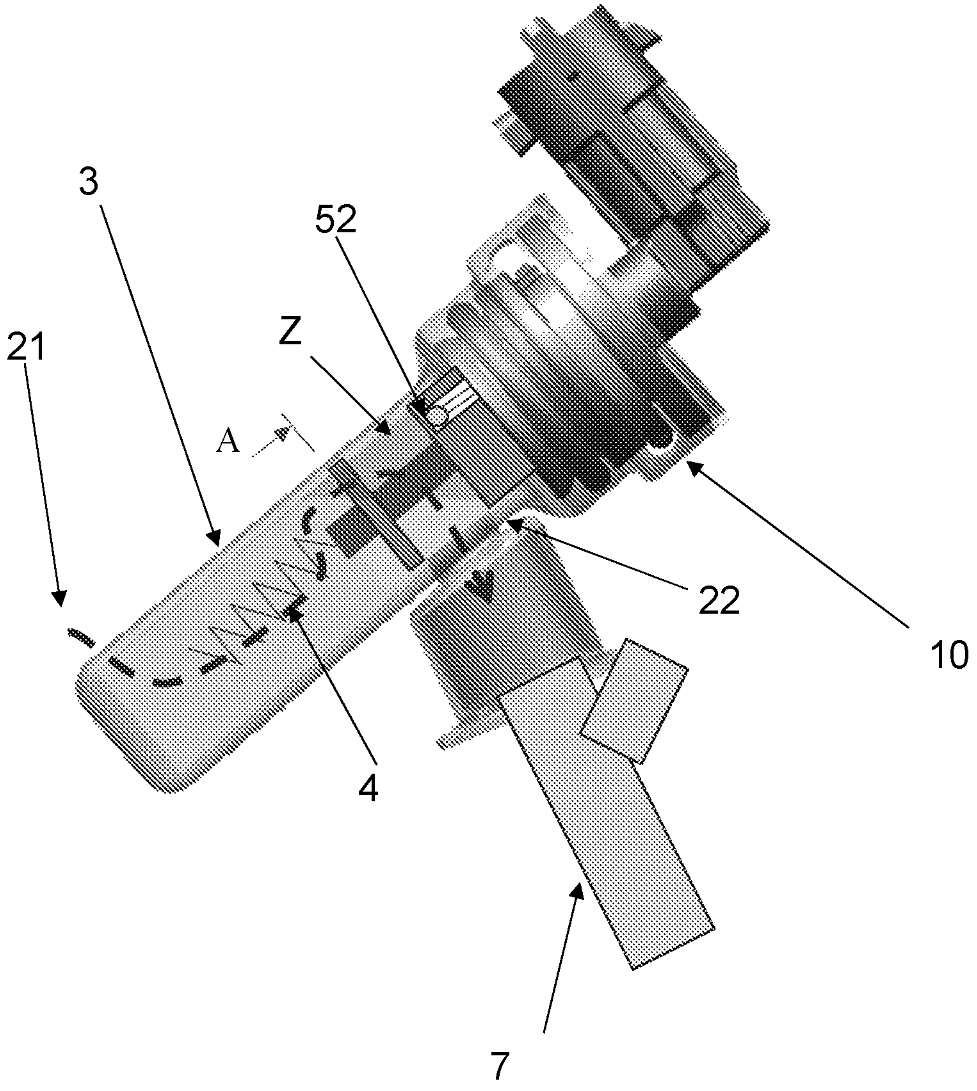
FIG. 2—Scheme of an embodiment of the fuel heating device where the interface region is positioned upwards.

Therefore, as can be seen from FIG. 1, the present invention describes a device for heating fuel applicable in fuel injected temperature management systems in internal combustion engines applicable to a vehicle, such as a car.

In more detail, the present invention describes a device for heating fuel equipped with

- at least one interface region 10;
- at least one fuel inlet opening 21;
- at least one fuel outlet opening 22;
- at least one fuel outlet portion 22;
- at least one heating chamber 3 provided with an internal region 31, cooperating with the interface region 10, so as to project from the inlet portion 21;
- at least one heating element 4 projecting from the interface region 10, fluidly associated with the heating chamber 3;

so that said device comprises a temperature sensor 51 provided with a thermo element 52 and associated with the interface region 10 and which projects from the interface region 10, so that the thermo element 52 is positioned downstream of the element heater 4 through the interior of the heating chamber.

The interface region is understood to be the region of the heating device where the electrical connector 11 (externally) and the heating element 4 (internally) are mounted. Preferably, connector 11 is provided with at least 3 terminals.

In a preferred embodiment, the present invention describes a device for heating fuel, where the thermo element 52 is positioned at a free end of the temperature sensor 5 opposite the point of association between the temperature sensor 51 and the region of interface 10. Commonly, the temperature sensor 5 comprises an external coating that protects the wiring, houses the thermo element 52, as well as provides structural rigidity to the temperature sensor 5, thus ensuring the position of the thermo element 52 in relation to the zone higher temperature Z.

This preferred embodiment described above is new and inventive, since the positioning and installation of the temperature sensor 51 in the downstream heater device 13 allows the temperature measurement to be taken in the zone of the highest temperature Z that the fuel reaches inside from the heating chamber 3, after passing through the heating element 4, responsible for heating the fuel, since the thermo element 52 (which effectively reads the fuel temperature) is positioned in the highest temperature zone Z.

Constructively, the present invention provides that the zone with the highest temperature Z of injected fuel is always close to the most extreme point of fuel output from the combustion chamber and entry into the fuel injection device 7, since the outlet opening fuel tank 22 is positioned above the inlet opening 21 with respect to a vertical plane.

Therefore, according to the embodiments described above, the configuration of the heating device provides homogeneous heating of the fuel, since the fuel enters the internal region 31 of the heating chamber 3 through the fuel inlet opening 21 positioned in its lower region, it is forced to pass completely through the heating element 4—carrying out the thermal exchange—and leaves heated through the fuel outlet opening 22 positioned in an upper region.

Additionally, the fuel heating device comprises a preferred configuration where the fuel outlet portion 22 is associated with at least one fuel injection device 7. However, this feature is not limiting.

The determination of the amount of energy required for the fuel to reach a target fuel temperature value at the current instant, according to the fuel temperature at the current instant, must be performed by a parameter processing device or control unit of the vehicle, which is primarily responsible for the intelligence of the engine as a whole. This control unit can comprise either the ECU (Electronic Control Unit—responsible for electronically managing all engine operation) already present in the vehicle, or an exclusive unit dedicated only to the fuel heating system.

That way, it should be noted that, as described above, the present invention achieves the objective of providing a device for heating injected fuel in internal combustion engines, which integrates a temperature sensor capable of measuring the temperature of the fuel immediately after heating, forming a unique set that provides great precision in the amount of power supplied to the heater, accuracy in the fuel preheating temperature and, consequently, great precision in the reduction of polluting gases.

What is claimed is:

1. A device for heating fuel equipped with
at least one interface region (10);
at least one fuel inlet opening (21);
at least one fuel outlet opening (22);
at least one fuel outlet portion (22);
at least one heating chamber (3) provided with an internal region (31), cooperating with the interface region (10), so as to project from the inlet portion (21);
at least one heating element (4) projecting from the interface region (10), fluidly associated with the heating chamber (3);
the device further comprises a temperature sensor (51) provided with a thermo element (52) and associated with the interface region (10) and which projects from the interface region (10), so that the thermo element (52) is positioned downstream of the heating element (4) through the internal region of the heating chamber,
wherein the temperature sensor (51) is provided with an external coating.

2. The device for heating fuel, according to claim 1, wherein the thermo element (52) is positioned at a free end of the temperature sensor (51) opposite a point of association between the temperature sensor (51) and the interface region (10).

3. The device for heating fuel, according to claim 1, wherein the interface region (10) comprises at least connector (11) with at least 3 terminals.

4. The device for heating fuel, according to claim 1, wherein the fuel outlet opening (22) is positioned above the inlet opening (21) in relation to a vertical plane.

5. The device for heating fuel, according to claim 1, wherein the fuel outlet portion (22) is associated with at least one fuel injection device (7).

* * * * *